United States Patent
Toyoda et al.

(10) Patent No.: US 11,296,545 B2
(45) Date of Patent: Apr. 5, 2022

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventors: Masaru Toyoda, Chuo-ku (JP); Hiroki Shigeta, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/256,478

(22) PCT Filed: Jul. 4, 2018

(86) PCT No.: PCT/JP2018/025320
§ 371 (c)(1),
(2) Date: Dec. 28, 2020

(87) PCT Pub. No.: WO2020/008549
PCT Pub. Date: Jan. 9, 2020

(65) Prior Publication Data
US 2021/0135488 A1 May 6, 2021

(51) Int. Cl.
*H02J 9/06* (2006.01)
*H02J 7/00* (2006.01)
(Continued)

(52) U.S. Cl.
CPC .......... *H02J 9/062* (2013.01); *H02J 7/00712* (2020.01); *H02M 1/00* (2013.01); *H02M 3/158* (2013.01);
(Continued)

(58) Field of Classification Search
CPC .... H02J 9/062; H02J 7/00712; H02J 2207/20; H02J 7/0013; H02J 9/061; H02M 1/00;
(Continued)

(56) References Cited

U.S. PATENT DOCUMENTS

2015/0180233 A1* 6/2015 Yamada ............. G06F 1/00
307/23
2016/0285307 A1* 9/2016 Wang ................. H02J 7/34
(Continued)

FOREIGN PATENT DOCUMENTS

| JP | 2004-72841 A | 3/2004 |
| JP | 2004-201397 A | 7/2004 |
| WO | WO 2017/179162 A1 | 10/2017 |

OTHER PUBLICATIONS

International Search Report dated Aug. 14, 2018 in PCT/JP2018/025320 filed Jul. 4, 2018, 2 pages.
(Continued)

*Primary Examiner* — Toan T Vu
(74) *Attorney, Agent, or Firm* — Oblon, McClelland, Maier & Neustadt, L.L.P.

(57) ABSTRACT

An uninterruptible power supply device includes: a converter that converts AC power supplied from an AC power supply into DC power and outputs the DC power to a first power supply node; a first bidirectional chopper that outputs DC power in a lead storage device to the first power supply node when the AC power supply has a power failure; a diode connected between the first power supply node and a second power supply node; a second bidirectional chopper that supplies and receives DC power between the second power supply node and a lithium ion battery; and a controller that controls the second bidirectional chopper to charge the lithium ion battery during regenerative operation of a load
(Continued)

and to discharge the lithium ion battery during power running operation of the load.

4 Claims, 4 Drawing Sheets

(51) Int. Cl.
*H02M 3/158* (2006.01)
*H02M 1/00* (2006.01)

(52) U.S. Cl.
CPC ........ *H02J 2207/20* (2020.01); *H02M 1/0009* (2021.05)

(58) Field of Classification Search
CPC .... H02M 3/158; H02M 1/0009; H02M 7/217; H02M 7/797
See application file for complete search history.

(56) References Cited

U.S. PATENT DOCUMENTS

2017/0093187 A1\* 3/2017 Park ..................... H02J 7/0024
2019/0181677 A1 6/2019 Toyoda

OTHER PUBLICATIONS

International Preliminary Report on Patentability and Written Opinion dated Jan. 14, 2021 in PCT/JP2018/025320 (with English language translation), 16 pages.
Indian Office Action dated May 13, 2021 in Indian Patent Application No. 202017056440 (with English translation), 5 pages.

\* cited by examiner

UNINTERRUPTIBLE POWER SUPPLY DEVICE

TECHNICAL FIELD

The present invention relates to an uninterruptible power supply device, and in particular to an uninterruptible power supply device that converts alternating current (AC) power supplied from an AC power supply into direct current (DC) power and supplies the DC power to a load.

BACKGROUND ART

For example, Japanese Patent Laying-Open. No. 2004-72841 (PTL 1) discloses an uninterruptible power supply device including a rectifier and a charger. The rectifier converts AC power supplied from an AC power supply into DC power and supplies the DC power to a load when the AC power supply is normal. The charger converts the AC power supplied from the AC power supply into DC power and stores the DC power in a storage battery when the AC power supply is normal. The storage battery is fully charged. When the AC power supply has a power failure, the DC power in the storage battery is supplied to the load.

CITATION LIST

Patent Literature

PTL 1: Japanese Patent Laying-Open. No. 2004-72841

SUMMARY OF INVENTION

Technical Problem

However, PTL 1 has a problem that, when regenerative energy is generated in the load, a regenerative current flows from the load to a DC unit of the uninterruptible power supply device, and the DC unit has an excessive voltage. As a countermeasure therefor, it is conceivable to adopt a method of decreasing the voltage of the DC unit by providing a resistor that converts the regenerative current into heat. With this method, however, the regenerative energy is wasted.

Accordingly, a main object of the present invention is to provide an uninterruptible power supply device that can effectively utilize regenerative energy generated in a load.

Solution to Problem

An uninterruptible power supply device in accordance with present invention includes: a converter that converts AC power supplied from an AC power supply into DC power and outputs the DC power to a first power supply node when the AC power supply is normal, and stops an operation when the AC power supply has a power failure; a first bidirectional chopper that stores the DC power generated by the converter in a first power storage device when the AC power supply is normal, and outputs the DC power in the first power storage device to the first power supply node when the AC power supply has a power failure; a first diode having an anode connected to the first power supply node, and a cathode connected to a second power supply node; a second bidirectional chopper that supplies and receives DC power between the second power supply node and a second power storage device; a DC line having one end connected to the second power supply node, and the other end connected to a load; a current detector that detects a current flowing through the DC line; and a first controller that controls the second bidirectional chopper based on a detection result of the current detector, to charge the second power storage device when the current is flowing from the load to the second power supply node, and to discharge the second power storage device when the current is flowing from the second power supply node to the load.

Advantageous Effects of Invention

In the uninterruptible power supply device in accordance with the present invention, when a regenerative current is flowing from the load to the second power supply node, the second power storage device is charged, and when a power running current is flowing from the second power supply node to the load, the second power storage device is discharged. Therefore, regenerative energy generated in the load can be effectively utilized.

DESCRIPTION OF EMBODIMENTS

First Embodiment

Figure 1:
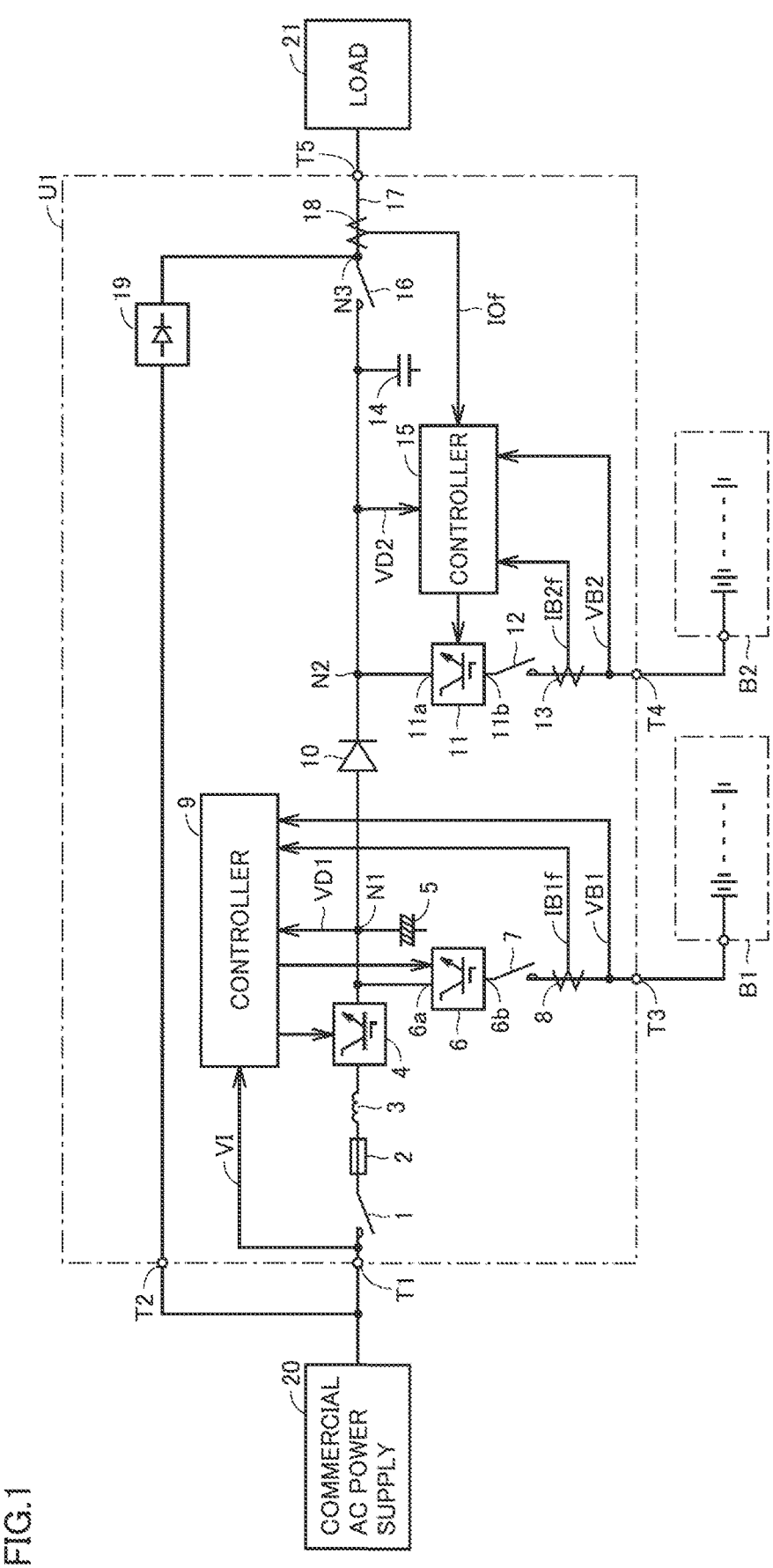
FIG. 1 is a circuit block diagram showing a configuration of an uninterruptible power supply device in accordance with a first embodiment of the present invention.

FIG. 1 is a circuit block diagram showing a configuration of an uninterruptible power supply device U1 in accordance with a first embodiment of the present invention. Although this uninterruptible power supply device U1 converts three-phase AC power supplied from a commercial AC power supply 20 into DC power and supplies the DC power to a load 21, FIG. 1 shows only a part related to one phase for simplification of the drawing and the description.

In FIG. 1, uninterruptible power supply device U1 includes AC input terminals T1 and T2, battery terminals T3 and T4, a DC output terminal T5, switches 1, 7, 12, and 16, a fuse 2, a reactor 3, a converter 4, capacitors 5 and 14, bidirectional choppers 6 and 11, a diode 10, controllers 9 and 15, a DC line 17, current detectors 8, 13, and 18, and a rectifier 19.

Both AC input terminals T1 and T2 receive the AC power having a commercial frequency supplied from commercial AC power supply 20. An instantaneous value of an AC voltage VI appearing at AC input terminal T1 is detected by controller 9. Controller 9 determines whether or not a power failure of commercial AC power supply 20 occurs based on the instantaneous value of AC voltage VI.

A lead storage battery B1 (a first power storage device) is connected to battery terminal T3. Lead storage battery B1 has an advantage that it has a large capacity and is available at an inexpensive price. A voltage VB1 between terminals of lead storage battery B1 is detected by controller 9. A lithium ion battery B2 (a second power storage device) is connected to battery terminal T4. Lithium ion battery B2 has an advantage that it can be charged and discharged at a high speed. A voltage VB2 between terminals of lithium ion battery B2 is detected by controller 15. Instead of each of batteries B1 and B2, a capacitor may be connected. Load 21 is connected to DC output terminal T5. Load 21 is driven by the DC power supplied from uninterruptible power supply device U1.

Figure 2:
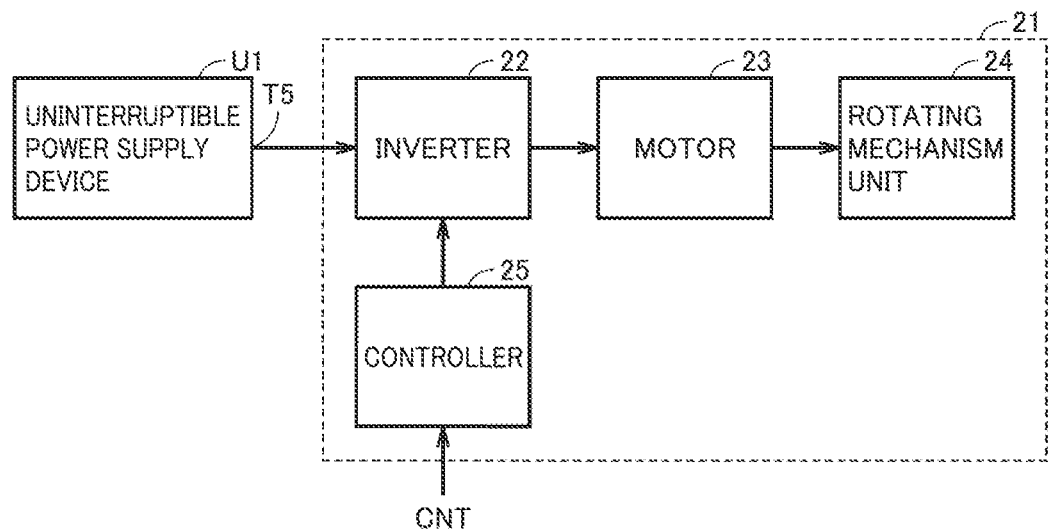
FIG. 2 is a block diagram illustrating a configuration of a load shown in FIG. 1.

FIG. 2 is a block diagram illustrating a configuration of load 21 shown in FIG. 1. In FIG. 2, load 21 includes an inverter 22, a motor 23, a rotating mechanism unit 24, and a controller 25. Inverter 22 is controlled by controller 25, and converts the DC power supplied from uninterruptible power supply device U1 into AC power having a frequency and a voltage instructed by controller 25. Motor 23 drives rotating mechanism unit 24 at a rotation speed according to the frequency of the AC power supplied from inverter 22. Controller 25 controls inverter 22 according to a control signal CNT.

A state where power is supplied from inverter 22 to motor 23 as in the case of accelerating rotating mechanism unit 24 by motor 23 is referred to as a power running state. Conversely, a state where power is supplied from motor 23 to inverter 22 as in the case of decelerating rotating mechanism unit 24 by motor 23 is referred to as a regenerative state. In the regenerative state, motor 23 is rotationally driven by rotating mechanism unit 24 and operates as a generator, and generates regenerative power (AC power). The regenerative power is converted into DC power by inverter 22, and is supplied to uninterruptible power supply device U1.

Turning back to FIG. 1, switch 1, fuse 2, and reactor 3 are connected in series between AC input terminal T1 and an input node of converter 4. Switch 1 is turned on during use of uninterruptible power supply device U1, and is turned off during maintenance of uninterruptible power supply device U1, for example.

Fuse 2 is blown when an overcurrent flows. Fuse 2 is provided to protect converter 4 and the like from the overcurrent. Reactor 3 passes the AC power having the commercial frequency supplied from commercial AC power supply 20 to converter 4, and prevents passage of a signal having a switching frequency generated in converter 4 toward commercial AC power supply 20.

Converter 4 includes a plurality of sets of insulated gate bipolar transistors (IGBTs) and diodes, and is controlled by controller 9. When the AC power is normally supplied from commercial AC power supply 20 (when commercial AC power supply 20 is normal), converter 4 converts the AC power supplied from commercial AC power supply 20 into DC power and outputs the DC power to a power supply node Ni (a first power supply node). When supply of the AC power from commercial AC power supply 20 is stopped (when commercial AC power supply 20 has a power failure), operation of converter 4 is stopped.

Capacitor 5 is connected to power supply node N1 to smooth and stabilize a voltage VD1 of power supply node N1. DC voltage VD1 appearing at power supply node N1 is detected by controller 9.

When commercial AC power supply 20 is normal, controller 9 controls converter 4 such that DC voltage VD1 of power supply node N1 becomes equal to a reference DC voltage VD1r, and when commercial AC power supply 20 has a power failure, controller 9 stops operation of converter 4. Reference DC voltage VD1r is set to a voltage that is lower than a DC output voltage VA of rectifier 19. When commercial AC power supply 20 has a power failure, controller 9 turns off all the IGBTs included in converter 4 to stop operation of converter 4 and prevent a current from flowing from power supply node NI toward commercial AC power supply 20.

Bidirectional chopper 6 (a first bidirectional chopper) has a high voltage-side node 6a connected to power supply node Ni, and a low voltage-side node 6b connected to battery terminal T3 via switch 7. Switch 7 is turned off during use of uninterruptible power supply device U1, and is turned on during maintenance of uninterruptible power supply device U1 and lead storage battery B1, for example. Current detector 8 detects a current IB1 flowing between bidirectional chopper 6 and lead storage battery B1, and outputs a signal IB1f indicating a detected value to controller 9.

Bidirectional chopper 6 includes IGBTs, diodes, and a reactor, and is controlled by controller 9. When commercial AC power supply 20 is normal, bidirectional chopper 6 stores the DC power generated by converter 4 in lead storage battery B 1, and when commercial AC power supply 20 has a power failure, bidirectional chopper 6 outputs the DC power in lead storage battery B1 to power supply node N1.

When commercial AC power supply 20 is normal, controller 9 (a second controller) controls bidirectional chopper 6, and thereby controls battery current IB1 such that voltage VB1 between the terminals of lead storage battery B1 becomes equal to a reference battery voltage VB1r. In addition, when commercial AC power supply 20 has a power failure, controller 9 controls bidirectional chopper 6, and thereby controls battery current IBI such that DC voltage VD1 of power supply node N1 becomes equal to reference DC voltage VD1r.

Reference battery voltage VB1r is set to a voltage that is lower than reference DC voltage VD1r (VB1r<VD1r). That is, bidirectional chopper 6 steps down DC voltage VD1 of power supply node N1 and provides it to lead storage battery B1, and steps up voltage VB1 between the terminals of lead storage battery B1 and provides it to power supply node N1.

Diode 10 has an anode connected to power supply node N1, and a cathode connected to a power supply node N2 (a second power supply node). When DC voltage VD1 of power supply node N1 is lower than a DC voltage VD2 of power supply node N2, diode 10 is turned off. When DC voltage VDI of power supply node N1 is higher than DC voltage VD2 of power supply node N2, diode 10 is turned on. Diode 10 is provided to prevent a current from flowing backward from power supply node N2 to power supply node N1.

Bidirectional chopper 11 (a second bidirectional chopper) has a high voltage-side node 11a connected to power supply node N2, and a low voltage-side node 11b connected to battery terminal T4 via switch 12. Switch 12 is turned on during use of uninterruptible power supply device U1, and is turned off during maintenance of uninterruptible power supply device U1 and lithium ion battery B2, for example. Current detector 13 detects a current IB2 flowing between bidirectional chopper 11 and lithium ion battery B2, and outputs a signal IB2f indicating a detected value to controller 15.

Bidirectional chopper 11 includes IGBTs, diodes, and a reactor, and is controlled by controller 15. When load 21 is performing regenerative operation, bidirectional chopper 11 stores DC power regenerated from load 21 in lithium ion battery B2, and when load 21 is performing power running operation, bidirectional chopper 11 supplies the DC power in lithium ion battery B2 to load 21.

Capacitor 14 is connected to power supply node N2 to smooth and stabilize DC voltage VD2 of power supply node N2. DC voltage VD2 of power supply node N2 is detected by controller 15. Switch 16 has one terminal connected to power supply node N2, and the other terminal (a node N3) connected to DC output terminal T5 via DC line 17. Switch 16 is turned on during use of uninterruptible power supply device U1, and is turned off during maintenance of uninterruptible power supply device U1, for example. Current detector 18 detects a current JO flowing through DC line 17, and provides a signal IOf indicating a detected value to controller 15.

Rectifier 19 includes at least one diode (a second diode), and is connected between AC input terminal T2 and node N3. Rectifier 19 converts the AC power supplied from commercial AC power supply 20 into DC power, and supplies the DC power to load 21. Rectifier 19 performs full-wave rectification, for example, on the AC voltage supplied from commercial AC power supply 20, and supplies the full-wave rectified voltage to load 21.

When commercial AC power supply 20 is normal and load 21 is performing power running operation, DC voltage VD2 of power supply node N2 is set to VA (V) by rectifier 19 and capacitor 14. Reference DC voltage VD1r is set to a voltage that is lower than DC voltage VA (V) (VD1r<VA). Therefore, in this case, diode 10 is turned off, and a consumption current of load 21 is supplied from rectifier 19. In addition, DC current I0 flows from node N3 to DC output terminal T5 via DC line 17, and a positive current (a power running current) is detected by current detector 18.

Controller 15 controls bidirectional chopper 11 based on DC voltage VD2 of power supply node N2, voltage VB2 between the terminals of lithium ion battery B2, output signal IB2f of current detector 13, and output signal IOf of current detector 18.

When load 21 performs regenerative operation, a regenerative current flows from load 21 to power supply node N2, and DC voltage VD2 of power supply node N2 increases. The regenerative current is detected by current detector 18 as a negative current.

In response to the negative current (that is, the regenerative current) being detected by current detector 18 and DC voltage VD2 of power supply node N2 exceeding a threshold voltage VTH, controller 15 controls bidirectional chopper 11, and thereby causes battery current IB2 having a value corresponding to regenerative current IO to flow from power supply node N2 to lithium ion battery B2 to charge lithium ion battery B2. Threshold voltage VTH is set to a voltage that is higher than output voltage VA of rectifier 19 (VTH>VA).

When battery current IB2 flows from bidirectional chopper 11 to lithium ion battery B2, DC voltage VD2 of power supply node N2 decreases. Controller 15 continues charging of lithium ion battery B2 when the negative current (that is, the regenerative current) is detected by current detector 18, even after DC voltage VD2 of power supply node N2 becomes lower than threshold voltage VTH. Controller 15 stops charging of lithium ion battery B2 when voltage VB2 between the terminals of lithium ion battery B2 reaches an upper limit voltage VH.

When the positive current (that is, the power running current) is detected by current detector 18, controller 15 controls bidirectional chopper 11, and thereby causes battery current IB2 having a value corresponding to power running current 10 to flow from lithium ion battery B2 to power supply node N2 to discharge lithium ion battery B2. Thus, currents are supplied from both rectifier 19 and lithium ion battery B2 to load 21. Controller 15 stops discharging of lithium ion battery B2 when voltage VB2 between the terminals of lithium ion battery B2 reaches a lower limit voltage VL.

Figure 3:
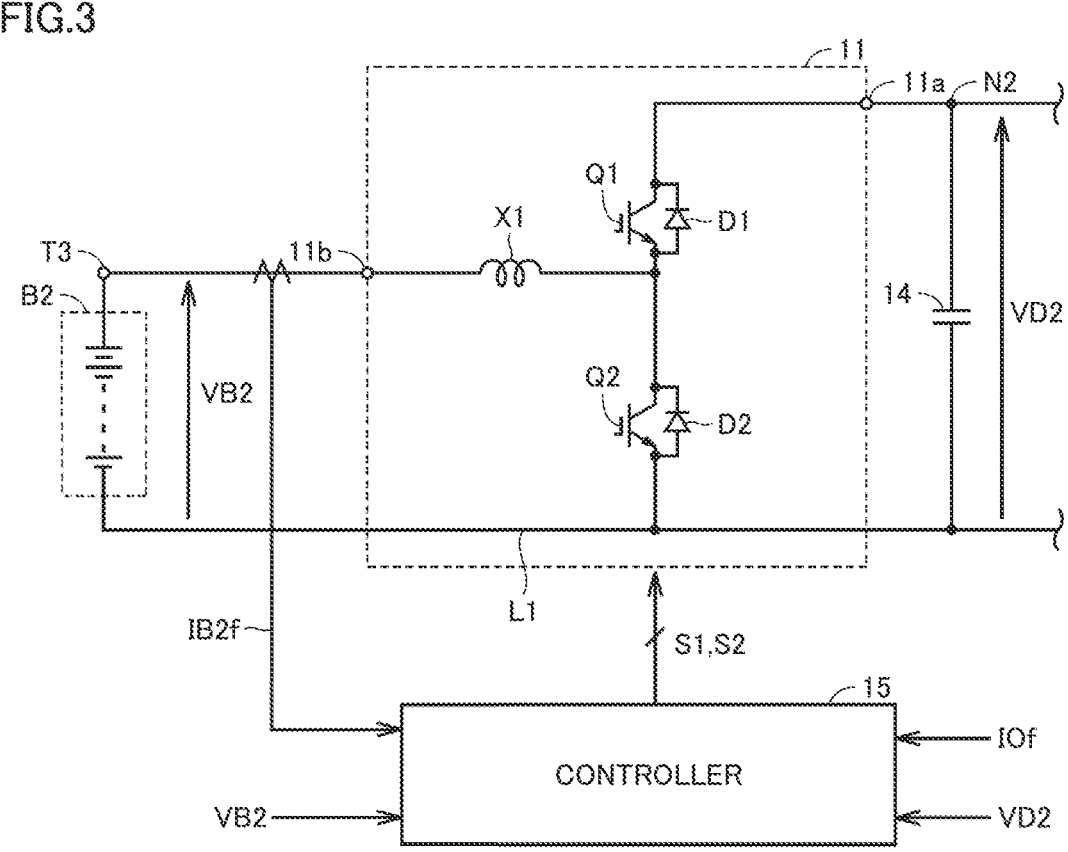
FIG. 3 is a circuit block diagram showing a configuration of a bidirectional chopper 11 shown in FIG. 1.

FIG. 3 is a circuit diagram showing a configuration of bidirectional chopper 11. In FIG. 3, bidirectional chopper 11 includes IGBTs Q1 and Q2, diodes D1 and D2, and a reactor X1. IGBT Q1 has a collector connected to high voltage-side node 11a, and an emitter connected to low voltage-side node 11b via reactor X1 and also connected to a collector of IGBT Q2. IGBT Q2 has an emitter connected to a reference potential line L1. Diodes D1 and D2 are connected in anti-parallel with IGBTs Q1 and Q2, respectively. Capacitor 14 (FIG. 1) is connected between power supply node N2 and reference potential line L1. A negative electrode of lithium ion battery B2 is connected to reference potential line L1.

IGBT Q1 is turned on and off at a predetermined frequency f, and stores regenerative power (DC power) supplied from load 21 during regenerative operation of load 21 in lithium ion battery B2. IGBT Q2 is fixed to an OFF state during regenerative operation of load 21. IGBT Q1 is controlled by a gate signal S1 from controller 15. Gate signal Si is set to an "H" level and an "L" level at predetermined frequency f. When gate signal S1 is set to the "H" level, IGBT Q1 is turned on, and when gate signal Si is set to the "L" level, IGBT Q1 is turned off.

When IGBT Q1 is turned on in a case where voltage VB2 between the terminals of lithium ion battery B2 is lower than upper limit voltage VH during regenerative operation of load 21, current IB2 flows through a path from power supply node N2, via IGBT Q1, reactor X1, and lithium ion battery B2, to reference potential line L1, and lithium ion battery B2 is charged and electromagnetic energy is stored in reactor X1.

When IGBT Q1 is turned off, a current flows through a path from one terminal of reactor X1 (a terminal closer to lithium ion battery B2), via lithium ion battery B2 and diode D2, to the other terminal of reactor X1, and lithium ion battery B2 is charged and the electromagnetic energy in reactor X1 is released.

A ratio between a time for which gate signal S1 is set to the "H" level (pulse width) and one cycle (1/f) is referred to as a duty ratio. By adjusting the duty ratio of gate signal S1, current IB2 that is to flow into lithium ion battery B2 can be adjusted. When the duty ratio of gate signal S1 is increased, current IB2 that is to flow into lithium ion battery B2 is increased. When the duty ratio of gate signal S1 is decreased, current IB2 that is to flow into lithium ion battery B2 is decreased. DC voltage VD2 of power supply node N2 is stepped down and provided to lithium ion battery B2, and VB2<VD2 is obtained.

IGBT Q2 is turned on and off at the predetermined frequency, and supplies the DC power in lithium ion battery B2 to load 21 during power running operation of load 21. IGBT Q2 is controlled by a gate signal S2 from controller 15. Gate signal S2 is set to the "H" level and the "L" level at predetermined frequency f. When gate signal S2 is set to the "H" level, IGBT Q2 is turned on, and when gate signal S2 is set to the "L" level, IGBT Q2 is turned off.

In a case where voltage VB2 between the terminals of lithium ion battery B2 is higher than lower limit voltage VL during power running operation of load 21, IGBT Q1 is fixed to an OFF state, and IGBT Q2 is turned on and off.

When IGBT Q2 is turned on, a current flows from a positive electrode of lithium ion battery B2, via reactor X1 and IGBT Q2, to the negative electrode of lithium ion battery B2, and electromagnetic energy is stored in reactor X1. When IGBT Q2 is turned off, the current that has been flowing from reactor X1 to IGBT Q2 is caused to flow from reactor X1 to diode D1 and flows via capacitor 14 to the negative electrode of lithium ion battery B2, and lithium ion battery B2 is discharged and the electromagnetic energy in reactor X1 is released.

A ratio between a time for which gate signal S2 is set to the "H" level (pulse width) and one cycle (1/f) is referred to as a duty ratio. By adjusting the duty ratio of gate signal S2, current IB2 that is to flow out of lithium ion battery B2 can be adjusted.

When the duty ratio of gate signal S2 is increased, current IB2 that is to flow out of lithium ion battery B2 is increased. When the duty ratio of gate signal S2 is decreased, current IB2 that is to flow out of lithium ion battery B2 is decreased. Voltage VB2 between the terminals of lithium ion battery B2 is stepped up and provided to power supply node N2, and VB2<VD2 is obtained.

In response to the negative current (that is, the regenerative current) being detected by current detector 18 (FIG. 1) and DC voltage VD2 of power supply node N2 exceeding threshold voltage VTH, controller 15 sets gate signal S1 to the "H" level and the "L" level at predetermined frequency f to turn on and off IGBT Q1 at predetermined frequency f and thereby charge lithium ion battery B2. On this occasion, controller 15 causes battery current IB2 having a value corresponding to regenerative current IO to flow from power supply node N2 to lithium ion battery B2, by adjusting the duty ratio of gate signal S1.

When battery current IB2 flows from bidirectional chopper 11 to lithium ion battery B2, DC voltage VD2 of power supply node N2 decreases. Controller 15 continues charging of lithium ion battery B2 when the negative current (that is, the regenerative current) is detected by current detector 18, even after DC voltage VD2 of power supply node N2 becomes lower than threshold voltage VTH. Controller 15 stops charging of lithium ion battery B2 when voltage VB2 between the terminals of lithium ion battery B2 reaches upper limit voltage VH.

In addition, when the positive current (that is, the power running current) is detected by current detector 18, controller 15 sets gate signal S2 to the "H" level and the "L" level at predetermined frequency f to turn on and off IGBT Q2 at predetermined frequency f and thereby discharge lithium ion battery B2. On this occasion, controller 15 causes battery current IB2 having a value corresponding to power running current 10 to flow from lithium ion battery B2 to power supply node N2, by adjusting the duty ratio of gate signal S2. Thus, currents are supplied from both rectifier 19 and lithium ion battery B2 to load 21. Controller 15 stops discharging of lithium ion battery B2 when voltage VB2 between the terminals of lithium ion battery B2 reaches lower limit voltage VL.

Figure 4:
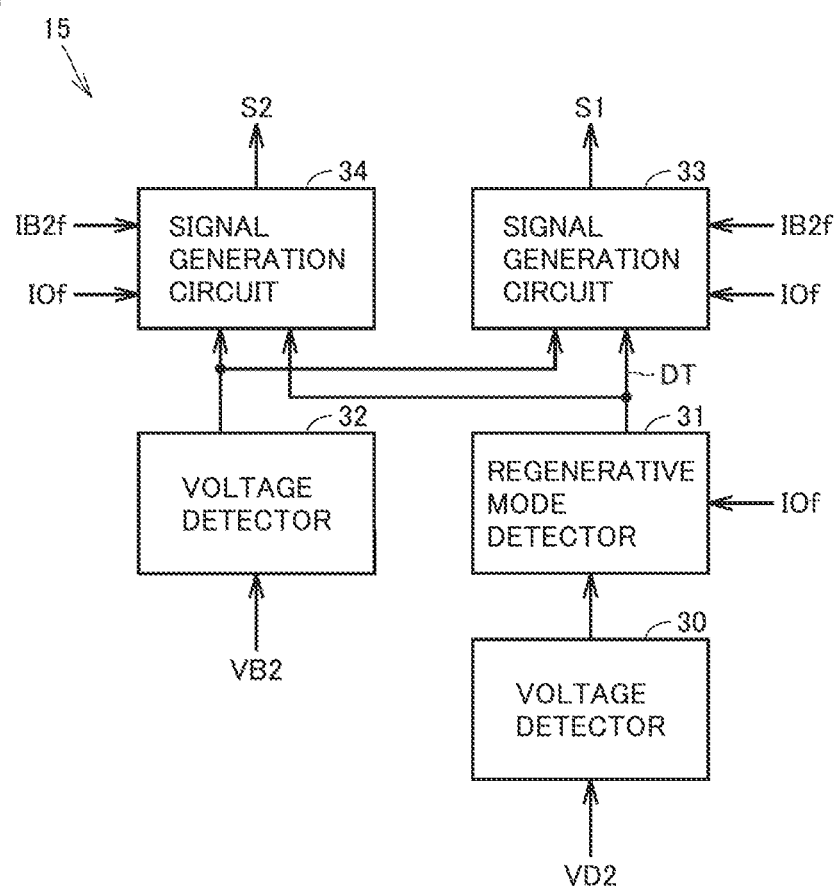
FIG. 4 is a block diagram showing a configuration of a controller shown in FIG. 3.

FIG. 4 is a block diagram showing a configuration of controller 15 shown in FIG. 3. In FIG. 4, controller 15 includes voltage detectors 30 and 32, a regenerative mode detector 31, and signal generation circuits 33 and 34. Voltage detector 30 detects DC voltage VD2 of power supply node N2, and outputs a signal indicating a detected value thereof to regenerative mode detector 31.

Regenerative mode detector 31 outputs a signal DT based on the output signal of voltage detector 30 and output signal IOf of current detector 18 (FIG. 1). When DC voltage VD2 detected by voltage detector 30 exceeds threshold voltage VTH and a negative current (regenerative current) flows through DC line 17, signal DT is set to the "H" level, which is an activated level.

Signal DT is maintained at the "H" level for a period in which the negative current (regenerative current) is flowing through DC line 17, even after DC voltage VD2 becomes lower than threshold voltage VTH. When a positive current (power running current) flows through DC line 17, signal DT is set to the "L" level, which is a deactivated level. Signal DT is provided to signal generation circuits 33 and 34. Voltage detector 32 detects voltage VB2 between the terminals of lithium ion battery B2, and provides a signal indicating a detected value thereof to signal generation circuits 33 and 34.

Signal generation circuit 33 is activated for a period in which signal DT is at the "H" level, and sets gate signal S1 to the "H" level and the "L" level at predetermined frequency f. Activated signal generation circuit 33 operates based on output signals IB2f and IOf of current detectors 13 and 18, generates a current command value that is a value corresponding to regenerative current JO, and controls the duty ratio of gate signal S1 such that battery current IB2 that is to flow into lithium ion battery B2 has the current command value.

Thereby, battery current IB2 having a value corresponding to regenerative current IO flows into lithium ion battery B2, and voltage VB2 between the terminals of lithium ion battery B2 increases. When voltage VB2 between the terminals of lithium ion battery B2 reaches upper limit voltage VH, signal generation circuit 33 fixes gate signal S1 to the "L" level, and stops charging of lithium ion battery B2. In addition, when signal DT is set to the "L" level, signal generation circuit 33 is deactivated, and gate signal S1 is fixed to the "L" level.

Signal generation circuit 34 is activated for a period in which signal DT is at the "L" level, and sets gate signal S2 to the "H" level and the "L" level at predetermined frequency f. Activated signal generation circuit 34 operates based on output signals IB2f and IOf of current detectors 13 and 18, generates a current command value that is a value corresponding to power running current IO, and controls the duty ratio of gate signal S2 such that battery current IB2 that is to flow out of lithium ion battery B2 has the current command value.

Thereby, battery current IB2 having a value corresponding to power running current IO flows out of lithium ion battery B2, and voltage VB2 between the terminals of lithium ion battery B2 decreases. When voltage VB2 between the terminals of lithium ion battery B2 reaches lower limit voltage VL, signal generation circuit 34 fixes gate signal S2 to the "L" level, and stops discharging of lithium ion battery B2. In addition, when signal DT is set to the "H" level, signal generation circuit 34 is deactivated, and gate signal S2 is fixed to the "L" level.

Next, operation of this uninterruptible power supply device U1 is described. When commercial AC power supply 20 is normal, AC power supplied from commercial AC power supply 20 is converted into DC power by converter 4, and the DC power is stored in lead storage battery B1 by bidirectional chopper 6. DC voltage VD1 of power supply node N1 is maintained at reference DC voltage VD1r by controller 9, converter 4, and capacitor 5. Voltage VB1 between the terminals of lead storage battery B1 is maintained at reference battery voltage VB1r by controller 9 and bidirectional chopper 6.

Further, the AC power supplied from commercial AC power supply 20 is converted into DC power by rectifier 19, and is supplied to load 21. When load 21 is performing power running operation, DC voltage VD2 of power supply node N2 is maintained at DC voltage VA (V) by rectifier 19 and capacitor 14. Since DC voltage VD2 of power supply node N2, which is equal to VA, is set to a value that is higher than DC voltage VD1 of power supply node N1, which is equal to VD1r, on this occasion, diode 10 is turned off. Therefore, load 21 is operated by the DC power supplied from rectifier 19.

When load 21 starts regenerative operation, a regenerative current flows from load 21 to power supply node N2, and DC voltage VD2 of power supply node N2 increases. The regenerative current is detected by current detector 18 as a negative current. When the negative current (regenerative current) is detected by current detector 18 and DC voltage VD2 of power supply node N2 exceeds threshold voltage VTH, regenerative power is stored in lithium ion battery B2 by controller 15 and bidirectional chopper 11.

When the regenerative power is stored in lithium ion battery B2, DC voltage VD2 of power supply node N2 decreases. Charging of lithium ion battery B2 is continued when the regenerative current is detected by current detector 18, even though DC voltage VD2 of power supply node N2 becomes lower than threshold voltage VTH.

When load 21 starts power running operation again, a positive current (power running current) is detected by current detector 18, and DC power in lithium ion battery B2 is supplied to load 21 via power supply node N2 by controller 15 and bidirectional chopper 11. In this case, the DC powers are supplied from both rectifier 19 and lithium ion battery B2 to load 21. When voltage VB2 between the terminals of lithium ion battery B2 decreases to lower limit voltage VL, discharging of lithium ion battery B2 is stopped. When discharging of lithium ion battery B2 is stopped, the DC power is supplied only from rectifier 19 to load 21.

When a power failure of commercial AC power supply 20 occurs, operation of converter 4 is stopped by controller 9, and the DC power in lead storage battery B1 is supplied to load 21 via bidirectional chopper 6 and diode 10. When commercial AC power supply 20 has a power failure, the diode included in rectifier 19 is turned off, preventing a current from flowing from node N3 to AC input terminal T2 via rectifier 19. DC voltage VD1 of power supply node N1 is maintained at reference DC voltage VD1r by controller 9, bidirectional chopper 6, and capacitor 5.

When load 21 is performing power running operation, the DC power in lead storage battery B1 is supplied to load 21 via diode 10 by controller 9 and bidirectional chopper 6. When load 21 starts regenerative operation, regenerative power is stored in lithium ion battery B2, as described above.

When load 21 starts power running operation again, DC power in lithium ion battery B2 is supplied to load 21 via power supply node N2, as described above. When voltage VB2 between the terminals of lithium ion battery B2 decreases to lower limit voltage VL, discharging of lithium ion battery B2 is stopped. When discharging of lithium ion battery B2 is stopped, the DC power is supplied from lead storage battery B1 to load 21 via bidirectional chopper 6 and diode 10. Therefore, operation of load 21 can be continued for a period in which the DC power is stored in lead storage battery B1.

As described above, in the first embodiment, when load 21 is performing regenerative operation, the regenerative power from load 21 is stored in lithium ion battery B2, and when load 21 resumes power running operation, the DC power in lithium ion battery B2 is supplied to load 21. Therefore, regenerative energy generated in load 21 can be effectively utilized.

Second Embodiment

Figure 5:
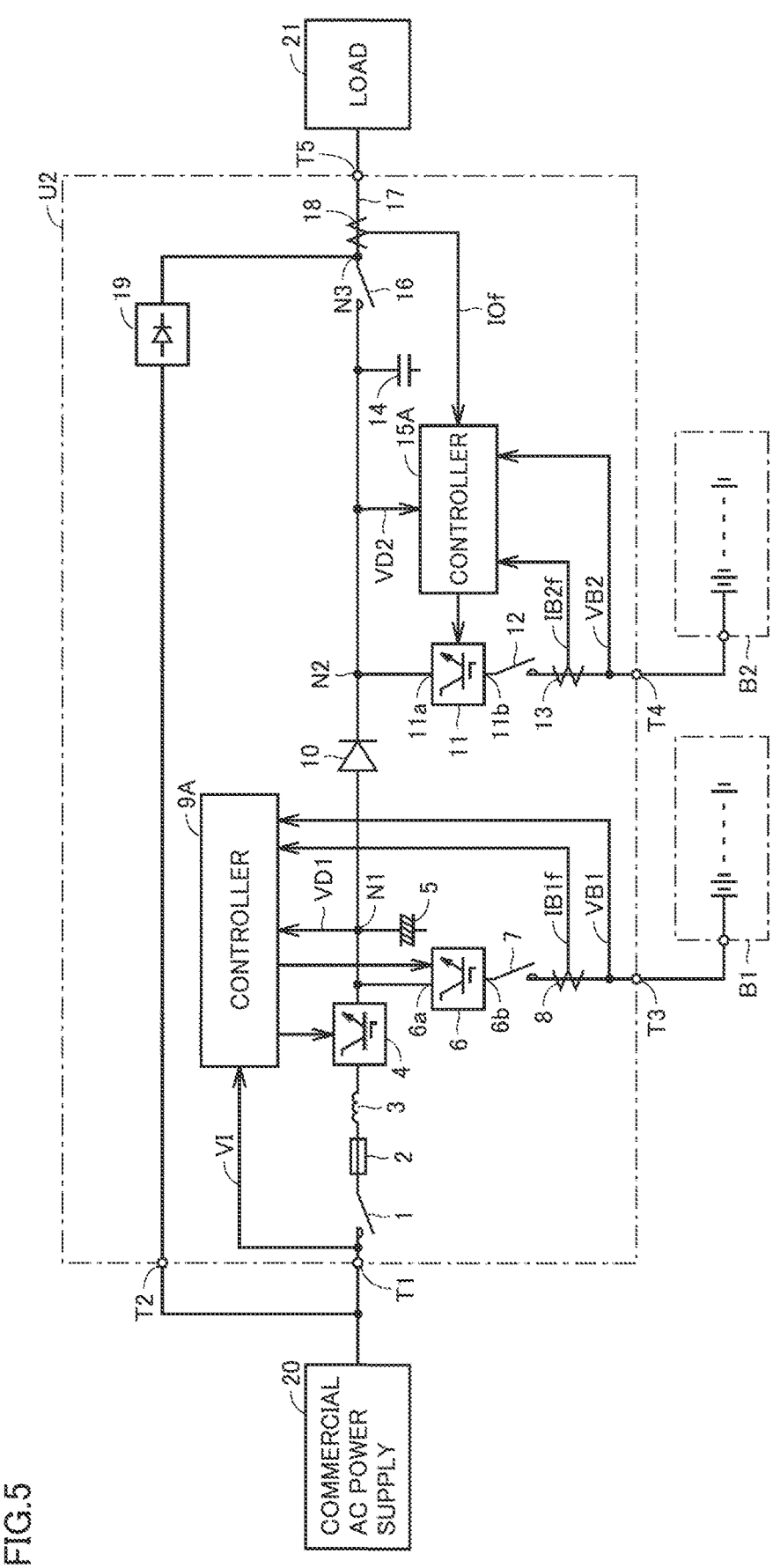
FIG. 5 is a circuit block diagram showing a configuration of an uninterruptible power supply device in accordance with a second embodiment of the present invention.

FIG. 5 is a circuit block diagram showing a configuration of an uninterruptible power supply device U2 in accordance with a second embodiment of the present invention, which is to be compared with FIG. 1. Referring to FIG. 5, uninterruptible power supply device U2 includes controllers 9A and 15A, instead of controllers 9 and 15, respectively, of uninterruptible power supply device U1.

Controller 9A is different from controller 9 in that DC voltage VD1 of power supply node N1 is maintained at a reference DC voltage VD1rA that is higher than reference DC voltage VD1r (VD1rA>VD1r). Reference DC voltage VD1rA is set to a voltage that is higher than output voltage VA of rectifier 19 (VD1rA>VA).

Thus, in a case where load 21 is performing power running operation when commercial AC power supply 20 is normal, diode 10 is turned on, and the DC power generated by converter 4 is supplied to load 21 via diode 10. Further, when commercial AC power supply 20 has a power failure, operation of converter 4 is stopped, and the DC power in lead storage battery B1 is supplied to load 21 via bidirectional chopper 6 and diode 10. In either case, the diode included in rectifier 19 is turned off.

In a case where converter 4 has a failure when commercial AC power supply 20 is normal, DC voltage VD1 of power supply node N1 becomes lower than DC voltage VA, and thus diode 10 is turned off and the DC power is supplied from rectifier 19 to load 21.

In addition, controller 15A is different from controller 15 in that a threshold voltage VTHA that is higher than threshold voltage VTH is used (VTHA>VTH). This threshold voltage VTHA is set to a voltage that is higher than DC voltage VD1 of power supply node N1, which is equal to VD1rA (VTHA>VD1rA).

Next, operation of this uninterruptible power supply device U2 is described. When commercial AC power supply 20 is normal, AC power supplied from commercial AC power supply 20 is converted into DC power by converter 4, and the DC power is supplied to load 21 via diode 10 and is also stored in lead storage battery B1 by bidirectional chopper 6. DC voltage VD1 of power supply node N1 is maintained at reference DC voltage VD1rA by controller 9A, converter 4, and capacitor 5. Voltage VB1 between the terminals of lead storage battery B1 is maintained at reference battery voltage VB1r by controller 9A and bidirectional chopper 6.

When load 21 is performing power running operation, DC voltage VD2 of power supply node N2 is maintained at reference DC voltage VD1rA by controller 9A, converter 4, and capacitors 5 and 14. However, it is assumed that the threshold voltage of diode 10 is sufficiently lower than reference DC voltage VD1rA. Therefore, load 21 is operated by the DC power supplied from converter 4.

When load 21 starts regenerative operation, a regenerative current flows from load 21 to power supply node N2, and DC voltage VD2 of power supply node N2 increases. The regenerative current is detected by current detector 18 as a negative current. When the negative current (regenerative current) is detected by current detector 18 and DC voltage VD2 of power supply node N2 exceeds threshold voltage VTHA, regenerative power is stored in lithium ion battery B2 by controller 15A and bidirectional chopper 11.

When the regenerative power is stored in lithium ion battery B2, DC voltage VD2 of power supply node N2 decreases. Charging of lithium ion battery B2 is continued when the regenerative current is detected by current detector 18, even though DC voltage VD2 of power supply node N2 becomes lower than threshold voltage VTHA.

When load 21 starts power running operation again, a positive current (power running current) is detected by current detector 18, and DC power in lithium ion battery B2 is supplied to load 21 via power supply node N2 by controller 15A and bidirectional chopper 11. In this case, the DC powers are supplied from both converter 4 and lithium ion battery B2 to load 21. When voltage VB2 between the terminals of lithium ion battery B2 decreases to lower limit voltage VL, discharging of lithium ion battery B2 is stopped. When discharging of lithium ion battery B2 is stopped, the DC power is supplied only from converter 4 to load 21.

When a power failure of commercial AC power supply 20 occurs, operation of converter 4 is stopped by controller 9A, and the DC power in lead storage battery B1 is supplied to load 21 via bidirectional chopper 6 and diode 10. When commercial AC power supply 20 has a power failure, the diode included in rectifier 19 is turned off, preventing a current from flowing from node N3 to AC input terminal T2 via rectifier 19. DC voltage VD1 of power supply node N1 is maintained at reference DC voltage VD1r by controller 9A, bidirectional chopper 6, and capacitor 5.

When load 21 is performing power running operation, the DC power in lead storage battery B1 is supplied to load 21 via diode 10 by controller 9A and bidirectional chopper 6. When load 21 starts regenerative operation, regenerative power is stored in lithium ion battery B2, as described above.

When load 21 starts power running operation again, DC power in lithium ion battery B2 is supplied to load 21 via power supply node N2, as described above. When voltage VB2 between the terminals of lithium ion battery B2 decreases to the lower limit voltage, discharging of lithium ion battery B2 is stopped. Even when discharging of lithium ion battery B2 is stopped, the DC power is supplied from lead storage battery B1 to load 21 via bidirectional chopper 6 and diode 10. Therefore, operation of load 21 can be continued for a period in which the DC power is stored in lead storage battery B1.

In a case where converter 4 has a failure when commercial AC power supply 20 is normal, DC voltage VDI of power supply node N1 becomes lower than DC voltage VA, and thus diode 10 is turned off and the DC power is supplied from rectifier 19 to load 21. The operation in the case where load 21 performs power running operation or regenerative operation is the same as that in the first embodiment.

Since other components and operations are the same as those in the first embodiment, the description thereof is not repeated. Also in the second embodiment, the same effect as that in the first embodiment can be obtained.

It should be understood that the embodiments disclosed herein are illustrative and non-restrictive in every respect. The present invention is defined by the scope of the claims, rather than the description above, and is intended to include any modifications within the scope and meaning equivalent to the scope of the claims.

REFERENCE SIGNS LIST

U1, U2: uninterruptible power supply device; T1, T2: AC input terminal; T3, T4: battery terminal; T5: DC output terminal; 1, 7, 12, 16: switch; 2: fuse; 3: reactor; 4: converter; 5, 14: capacitor; 6, 11: bidirectional chopper; 10: diode; 9, 9A, 15, 15A, 25: controller; 17: DC line; 8, 13, 18: current detector; 19: rectifier; 20: commercial AC power supply; 21: load; Bl: lead storage battery; B2: lithium ion battery; 22: inverter; 23: motor; 24: rotating mechanism unit; Q1, Q2: IGBT; D1, D2: diode; X1: reactor; L1: reference potential line; 30, 32: voltage detector; 31: regenerative mode detector; 33, 34: signal generation circuit.

The invention claimed is:

1. An uninterruptible power supply device comprising:
a converter that converts AC power supplied from an AC power supply into DC power and outputs the DC power to a first power supply node when the AC power supply is normal, and stops an operation when the AC power supply has a power failure;
a first bidirectional chopper that stores the DC power generated by the converter in a first power storage device when the AC power supply is normal, and outputs the DC power in the first power storage device to the first power supply node when the AC power supply has a power failure;
a first diode having an anode connected to the first power supply node, and a cathode connected to a second power supply node;
a second bidirectional chopper that supplies and receives DC power between the second power supply node and a second power storage device;
a DC line having one end connected to the second power supply node, and the other end connected to a load;
a current detector that detects a current flowing through the DC line; and
a first controller that controls the second bidirectional chopper based on a detection result of the current detector, to charge the second power storage device when the current is flowing from the load to the second power supply node, and to discharge the second power storage device when the current is flowing from the second power supply node to the load;
a rectifier that includes a second diode, converts the AC power supplied from the AC power supply into DC power, and outputs the DC power to the second power supply node; and
a second controller that:
when the AC power supply is normal, controls the converter such that a DC voltage of the first power supply node becomes equal to a reference DC voltage that is higher than an output voltage of the rectifier, and
when the AC power supply has a power failure, stops operation of the converter and controls the first bidirectional chopper such that the DC voltage of the first power supply node becomes equal to the reference DC voltage.

2. The uninteruptible power supply device according to claim 1, wherein
the first controller
starts charging of the second power storage device in response to the DC current flowing from the load to the second power supply node and a voltage of the second power supply node exceeding a threshold voltage, and
continues the charging of the second power storage device when the current is flowing from the load to the second power supply node, even after the voltage of the second power supply node becomes lower than the threshold voltage.

3. The uninteruptible power supply device according to claim 1, wherein, when the second power storage device is discharged, the first controller controls the second bidirectional chopper such that a portion of the current flowing from the second power supply node to the load is supplied from the second power storage device.

4. The uninterruptible power supply device according to claim wherein
the first power storage device is a lead storage battery, and
the second power storage device is a lithium ion battery.

* * * * *